July 2, 1957 P. TADINGER 2,797,727
PRESS MOLD FOR COLD MOLDING OF CUSHIONS OF
COILED CORRUGATED CARDBOARD
Filed April 25, 1955 2 Sheets-Sheet 2
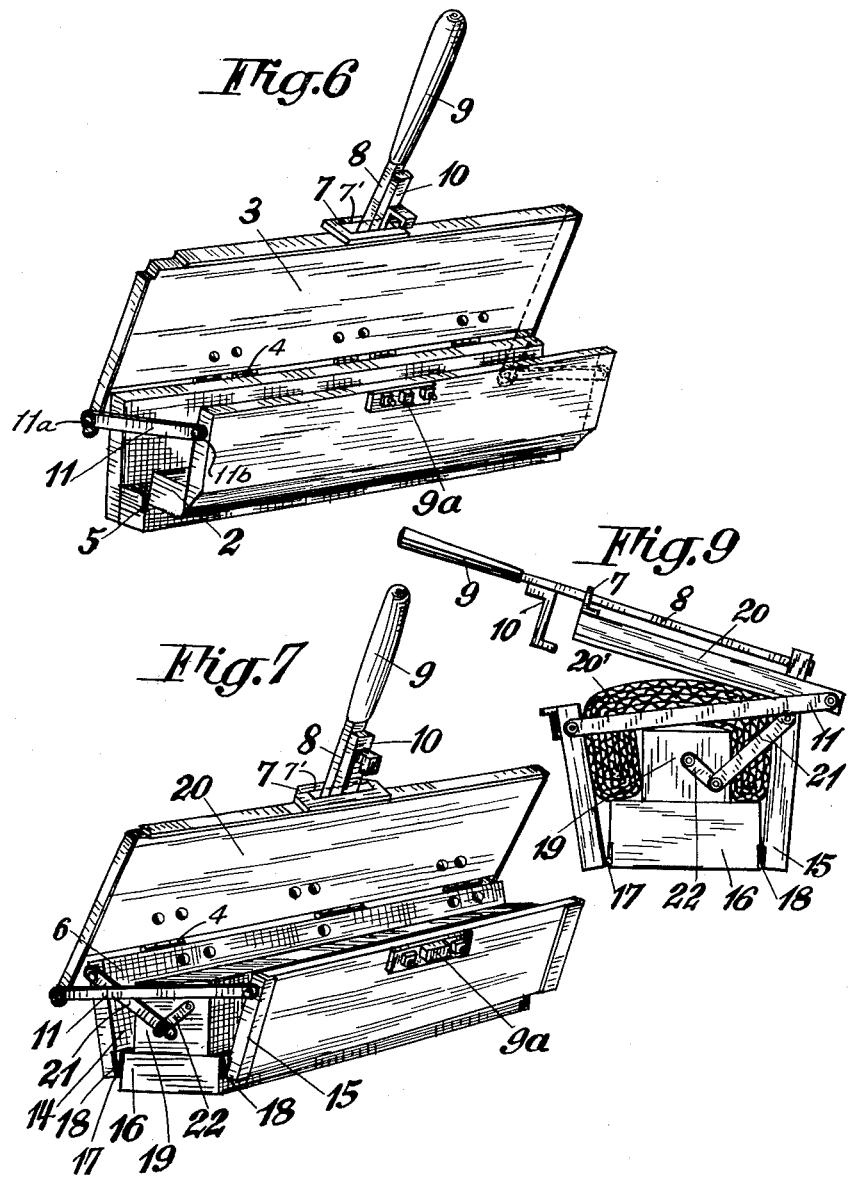
INVENTOR.
P. Tadinger United States Patent Office 2,797,727
Patented July 2, 1957

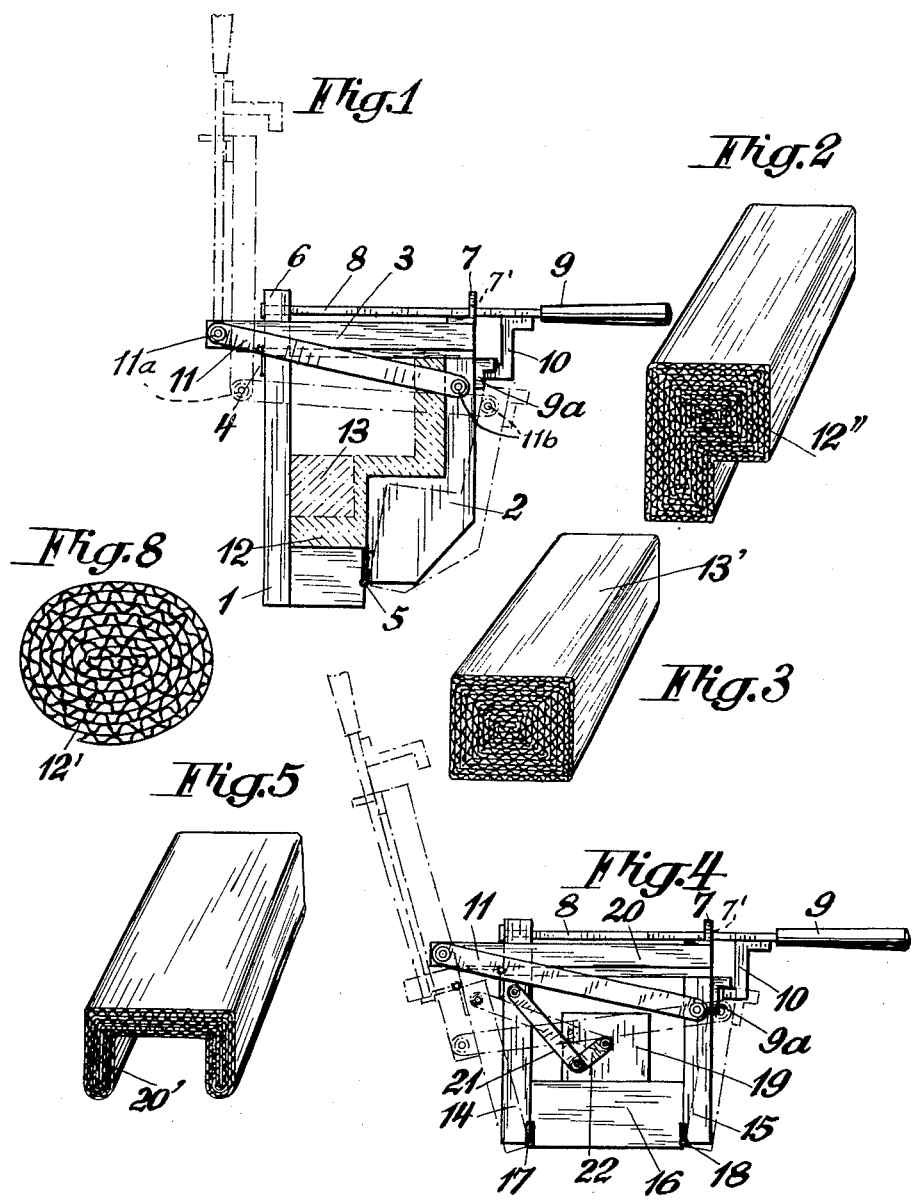

2,797,727

PRESS MOLD FOR COLD MOLDING OF CUSHIONS OF COILED CORRUGATED CARDBOARD

Paul Tadinger, Vienna, Austria, assignor to Oscar Leopold Ladner, Vienna, Austria Application April 25, 1955, Serial No. 503,739

Claims priority, application Austria May 12, 1954

4 Claims. (Cl. 154—1)

The present invention relates broadly to the art of molding or shaping of materials. More particularly, this invention is concerned with a mold for shaping cushions or shock absorbing elements that are made of corrugated cardboard.

This invention is directed to an improvement in the art of manufacturing paddings for packings as set forth in my prior U. S. Patent No. 2,575,898 dated November 20, 1951, and entitled "Paddings for Packings and Method of Manufacturing the Same." In accordance with that prior patent it is known to make shock absorbing cushions adapted for insertion in containers by applying adhesive in tacky condition to the corrugations of a continuous strip of corrugated cardboard, following which the strip is rolled into a loose roll of the desired dimensions, the roll is severed from the strip and subjected to heat and pressure while the adhesive is still tacky in order to alter the bodily form of the roll and provide the desired body structure of the shock absorbing cushion. In the preferred arrangement the body structure includes at least one leg and an end member extending therefrom, and the pressure is applied in a direction perpendicular to the axes of the corrugations and the body is maintained under heat and pressure until the adhesive has solidified to maintain the altered form of the roll.

The devices heretofore utilized to accomplish the above method are complicated by the necessity of providing heat during the pressing operation.

The prior art further indicates that it is old to provide pressing devices which merely press flat corrugated cardboard pieces cut to length between two plates.

The present invention, therefore, has for an object to provide an economical press mold for cold shaping coiled or wound corrugated cardboard.

More particularly, the invention has for an object to provide a pressing mold capable of creating a padding or packing that is rectangular, U-shaped in cross section, square, or of other desired profile.

It is a specific object of this invention to provide a pressing mold which includes at least two press jaws pivotally interconnected or hinged together and with their inner faces determining the profile of the completed corrugated cushion and connecting means including a tensioning device operable to provide for simultaneous opening and closing of the mold jaws and with the mold jaws being movable simultaneously to encompass the coiled or wound corrugated body from all sides to simultaneously apply pressure thereagainst.

As a still more specific object, the invention provides a press mold which includes an upper pressing jaw or cover incorporating a handle or hand grip and means mounting the cover for swinging movement about the axis of the hinges of one of at least a pair of side press jaws with the further inclusion of connecting means extending from the cover to the other side press jaw constituted by a pivoted lever arm that is disposed outside the axis of swing of the cover and which lever arm upon the upward swinging movement of the cover imparts movement to the lateral or side pressing jaw to move the same to press opening position.

Further and more specific objects will be apparent from the following description taken in connection with the accompanying drawing, in which:

Figure 1 is a diagrammatic side view partly in section illustrating an embodiment including three pressing jaws, Figures 2 and 3 are perspective views illustrating the cross sectional shape of cushions or paddings produced by the mold of Figure 1, Figure 4 is a diagrammatic end elevational view illustrating a modified form of press mold, Figure 5 is a perspective view illustrating the cross sectional shape of a padding or cushion produced by the mold of Figure 4, Figure 6 is a perspective view illustrating the mold of Figure 1 in the open position, Figure 7 is a view similar to Figure 6, but illustrating the mold of Figure 4 in open position, Figure 8 illustrates an oval shaped roll prior to its compression and, Figure 9 illustrates the compressing of a relatively flat wound cushion in the press mold arrangement of Figure 4.

In accordance with the embodiment of the invention illustrated in Figures 1 and 6, the press mold comprises three press jaws that are hingedly interconnected and which will surround a section of coiled or round corrugated cardboard throughout its length. The three jaws define a mold having opposite open ends and when closed as in Figure 1 maintain a body of rolled corrugated cardboard having adhesive applied thereto prior to rolling under pressure until the adhesive has set throughout the longitudinal extent of the body. Since the opposite ends of the mold are open, there is no pressure applied axially of the corrugations. Three press jaws constructed and arranged to form the lateral walls of a mold are hingedly interconnected along their lower edges by hinges and pivotally connected at their upper portions by lever arms.

Thus, the constructional form illustrated in Figure 1 provides a press mold for cold shaping of a rolled or coiled section of corrugated cardboard which can previously be prepared in the manner set forth in my prior patent. The mold includes two lateral or side pressing jaws 1 and 2 and an upper pressing jaw 3. The latter jaw constitutes a cover. The lateral jaws 1 and 2 are maintained in spaced relation by a block 1 secured to the inner side of the press jaw 1 along the lower end thereof, these jaws being hinged together by hinge means denoted at 5 and the cover or upper pressing jaw 3 is hinged to side jaw 1 by hinge means denoted at 4. As illustrated, the dimension of the cover from front to rear of the mold is greater than the distance between the outer surfaces of jaws 1 and 2 when these jaws are closed. The hinge means 4 are mounted on the undersurface of the cover inwardly of the end that protrudes beyond jaw 1 and the hinge means are connected to the exterior of jaw 1 along its upper edge. A rod 8 is movably fastened to cover 3 in bracket means denoted at 6 and 7. The rod being capable of swinging movement in a horizontal direction in the bracket 6 and the bracket 7 having a slot therein as at 7', Figures 6 and 7, accommodating this horizontal movement. The rod 8 includes an extended portion providing a hand grip 9 which is grasped during a molding operation to raise and lower the cover between open and closed position. To hold the mold parts in closed position there is provided a catch device including component 10 carried by the rod 8 and component 9a carried by pressing jaw 2 and engaged by the component 10 upon horizontal manipulation of the handle 9 when the mold is closed. The cover 3 is connected with lateral or side pressing jaw 2 by a tensioning device constituted by the pivoted lever arm 11. The lever arm 11 is pivoted at one end to the cover 3 on a portion of the latter that extends beyond the hinge 4 and at its other end to the upper portion of the side jaw 2, these pivotal connections being denoted at 11a and 11b, respectively.

When the cover 3 is swung upwardly in the direction of the arrow to the dotted line position in Figure 1, the mold is opened and when the end of lever arm 11 adjacent pivotal connection 11a swings downwardly and passes the axis of hinge 4 the other end of this lever arm pushes side jaw 2 away from side jaw 1 about hinge 5.

As clearly indicated in Figure 1, the inner faces of jaws 1 and 2 constitute a right angled or L-shaped profile for determining the cross sectional shape of the finished cushion, that is, to provide a body structure that includes at least one leg and an end member. If right angled profiles of smaller dimensions are desired, step-like insert members such as 12 can be inserted in the mold before the coil of corrugated cardboard is inserted. By using an additional insert 13 of square cross section to fill the lower step formed by the insert 12 the end product will be a rectangular cushion having a substantially square cross section.

Figure 3 illustrates in perspective the cushion 13' obtained from the mold when both inserts 12 and 13 are incorporated therein. Figure 2 illustrates the smaller size right angular cross section padding 12' obtained when only the step insert 12 is utilized. Obviously with the inserts removed the finished padding will have the appearance of Figure 2 but will be of larger dimensions. Figure 4 illustrates a modified form of mold distinguished from the embodiment of Figure 1 in that it includes two side pressing jaws 14 and 15, respectively, hinged at 17 and 18 to a bottom jaw member 16. The bottom jaw 16 carries what can be termed a plunger or body 19 of square cross section mounted in the vertical median plane of the bottom 16. Thus the bottom, including the plunger and the facing inner surfaces of the side jaws 14 and 15, together with the cover or top jaw 20, forms a mold opening that is U-shaped in cross section that results in the production of the U-shaped padding or cushion 20' shown in Figure 5. In order to limit the swinging path of the side pressing jaws 14 and 15, that is, in their movement to mold opening position, two link members 21 and 22 are included. These links are pivotally interconnected and link 21 is pivoted to side pressing jaw 14 while link 22 is pivoted to the plunger or center piece 19. The rod and handle construction 8 and 9 is the same as in Figure 1 and as soon as cover 20 of Figure 4 is raised manually to open position both jaws 14 and 15 swing about their hinges 17 and 18 until the levers 21, 22 are in alignment. This limits the degree of opening of the side jaws. Simultaneously the lever 11 connected between the end of cover 20 that projects beyond the hinge connecting the same to side jaw 14 and the upper portion of side jaw 15 imparts outward movement to side jaw 15.

The operation of the mold shown in Figure 4 is as follows. After jaws 14, 15 and the cover have been moved to open position, that is, the dotted line positions, the coiled or wound corrugated cardboard body, already cut to predetermined length, is placed with one of its longitudinal sides disposed in the space between the side of plunger 19 and side jaw 14. When the cover is swung toward the operator by pulling on the hand grip the side jaw 14 is closed and the cardboard clamped between plunger 19 and jaw 14. Then the operator bends the cardboard throughout its length about the upper edge of plunger 19 and pushes the opposite longitudinal side of the corrugated cardboard piece into the space between plunger 19 and jaw 15, following which the cover is firmly closed and latched to apply pressure equally to all faces of the corrugated cardboard.

It is pointed out that the invention is not to be limited to the precise structural arrangement shown in the drawings since, for example, other type stop means limiting the outward movement of the jaws can be provided in lieu of the links 21 and 22.

It is further to be pointed out that the cardboard is preferably a continuous piece of single face corrugated cardboard rolled upon itself and deformed in the mold to provide a packing body including at least one leg and an end member 12', two legs and an end member 20', or a square cross section body 13' in which the body is of multi layers of corrugated cardboard and all layers comprising portions of the continuous piece with adhesive between the corrugations of one layer and the face of an adjacent layer.

The utilization of the press mold of this invention is effected by hand. Preferably, a single worker manipulates a plurality of molds. The worker uncoils a piece of corrugated cardboard already cut to the desired breadth. This piece is then cut to required length, for example, one meter, and then an adhesive is applied to the top of the corrugations. Finally, the now coated piece of adhesive is formed by hand into the shape of an oval coil, as in Figure 8, or a flat, rolled cushion as in Figure 9.

These bodies of Figures 8 and 9 are in effect a cushion blank and are in uncompressed condition. Either one of the blanks are inserted into a mold while the adhesive is still tacky. The handle 9, and, consequently, the top pressing jaw 3 that closes the mold is pulled downwardly into the position shown in Figures 1 and 4 so that the cardboard body within the mold is subjected to uniform pressure from all sides thereof and deformed into the cushion shapes shown, for example, in Figures 2 and 5. The drying period of the adhesive used determines how long the press mold remains closed. The mold may be opened when the adhesive is set to such an extent that the various layers of corrugated cardboard are firmly adhered together.

During the pressing period, the compressed cushion may be observed at its opposite ends since the mold is open at its ends. After the compressing operation has been completed, the now compressed and shaped cushion can be readily removed since the open ends of the mold will permit manipulation of the cushion out of the mold. In closing and opening the mold, the handle 9 is manipulated in the slot 7' so that when the mold is being closed, the inturned end of the latch component 10 clears the lug or latch component 9a whereupon when the mold is closed, the movement of the handle 9 is reversed and the in-turned end or nose of latch component 10 engages under the lug or catch 9a to hold the mold closed. The reversed manipulation of the handle is effected during the opening of the mold.

I claim:

1. A press mold for cold shaping coiled corrugated cardboard comprising plural hingedly interconnected mold jaws movable between a mold open and a mold closing position including two side jaws, means spacing the side jaws and a top jaw swingably mounted on one of the side jaws so as to overlie both side jaws in mold closing position and movable to a position to expose the space between the side jaws in mold open position so that a coiled section of corrugated cardboard having adhesive between mutually contacting surfaces of the section can be inserted between the side jaws, said jaws having inner faces shaped to conform a section of coiled corrugated cardboard to a predetermined cross section, tensioning means interconnecting at least two jaws to impart movement from one jaw to another so that the jaws move against a section of cardboard with equal pressure from all sides, releasable means for holding the jaws in mold closing position, the means spacing the side jaws comprising a bottom jaw having a plunger body fixed centrally on the upper surface thereof, the opposite side jaws being respectively hingedly interconnected to opposite sides of the bottom jaw, said top jaw being hingedly interconnected to the upper portion of one of the side jaws, a pair of links pivotally interconnected together and with the free end of one link pivoted to the plunger and the free end of the other link pivoted to the said one side jaw to limit the outward movement of said one side jaw relative to the bottom and said tensioning means comprising lever means connected at one end to the top jaw at an area thereof beyond its hinged connection with the said one side jaw and at its other end to the other side jaw, and said link means being alignable during the opening movement of the jaws to limit the outward swinging movement of the side jaws.

2. A press mold for the cold shaping of rolled, adhesively coated, corrugated cardboard comprising two side press jaws having opposite ends, means adjacent one end of the jaws for holding the same spaced and for mounting the same for relative swinging movement comprising a further press jaw means constituting a mold bottom, hinge means connecting said one end of each of the respective side jaws to opposite ends of said bottom and linkage means pivotally interconnected between its ends and at opposite ends to one side jaw and the bottom respectively so as to limit the mold opening movement of the mold side jaws, an additional press jaw having one dimension greater than the space between the side jaws when they are in their inner position so as to overlie and engage the other ends of the side jaws, hinge means inwardly of one side of the additional press jaw directly pivotally connecting the same with said other end of one of the side jaws, a double arm lever means including the portion of the additional press jaw projecting beyond the hinge means connecting this jaw with said one side jaw and a lever pivotally connected at one end to the projecting portion of the additional press jaw and at its other end adjacent said other end of the other side jaw, said double arm lever means moving the side jaws apart responsive to movement of the additional press jaw away from the mold bottom, manually operable means for swinging the additional press jaw away from the space between the side jaws to completely expose this space and means for locking the jaws together in closed position with the additional jaw engaging the said other ends of the side jaws so that all jaws subject a rolled, adhesively coated, corrugated cardboard body inserted between the side jaws to uniform pressure throughout the entire peripheral surface of the sides of the rolled body to deform the same into the shape determined by the space between the jaws with the jaws locked together and closed until the adhesive is set and the body is permanently deformed.

3. A press mold as claimed in claim 2 in which said mold bottom includes a portion of square cross section projecting toward the additional jaw and which portion has less transverse dimension than the space between the side jaws so that the mold will produce compressed cushions of U-shaped cross section.

4. A press mold for the cold shaping of rolled, adhesively coated corrugated cardboard comprising two side press jaws having opposite ends, means adjacent one end of the jaws including at least one hinge arrangement holding the jaws spaced from one another and mounting the same for relative swinging movement toward and away from one another, an additional press jaw having one dimension greater than the space between the side jaws when they are in their inner position so as to overlie and engage the other ends of the side jaws, hinge means inwardly of one side of the additional press jaw directly pivotally connecting the same with the said other end of one of the side jaws, a double arm lever means including the portion of the additional press jaw projecting beyond the hinge means connecting this jaw with said one side jaw and a lever pivotally connected at one end to the projecting portion of the additional press jaw and at its other end adjacent the said other end of the other side jaw, said double arm lever means moving the side jaws apart responsive to movement of the additional press jaw away from the mold bottom, manually operable means for swinging the additional jaw away from the other jaws and means for locking the jaws together in closed position with the additional jaw engaging the said other ends of the side jaws comprising a rod, means mounting the rod on the surface of the additional jaw opposite the space and adjacent the connection of this jaw with the said one side jaw for movement in a plane parallel to the said surface, said rod projecting beyond the opposite end of said additional jaw with the projecting portion constituting a handle, additional means carried by said additional jaw constraining the movement of said rod within said plane, a catch means mounted on the exterior of the side jaw adjacent the handle and lug means depending from the rod including a nose portion engageable with and releasable from the catch means on the said one side jaw in response to manipulation of the rod by the handle in said plane so that all jaws subject a rolled, adhesively coated, corrugated cardboard body inserted between the side jaws to uniform pressure throughout the entire peripheral surface of the sides of the rolled body to deform the same into the shape determined by the space between the jaws with the jaws locked together and closed until the adhesive is set and the body is permanently deformed.

References Cited in the file of this patent
UNITED STATES PATENTS
1,327,472    Henry _____ Jan. 6, 1920

FOREIGN PATENTS
849,351    France _____ Sept. 16, 1941
(1st addition to No. 51,206)